(12) United States Patent
Özer

(10) Patent No.: US 12,343,308 B2
(45) Date of Patent: Jul. 1, 2025

(54) PACKAGING FOR A PHARMACEUTICAL PRODUCT

(71) Applicant: Arm Limited, Cambridge (GB)

(72) Inventor: Emre Özer, Cambridge (GB)

(73) Assignee: Arm Limited, Cambridge (GB)

( * ) Notice: Subject to any disclaimer, the term of this patent is extended or adjusted under 35 U.S.C. 154(b) by 364 days.

(21) Appl. No.: 17/907,059

(22) PCT Filed: Feb. 8, 2021

(86) PCT No.: PCT/GB2021/050280
§ 371 (c)(1),
(2) Date: Sep. 22, 2022

(87) PCT Pub. No.: WO2021/191579
PCT Pub. Date: Sep. 30, 2021

(65) Prior Publication Data
US 2023/0108006 A1 Apr. 6, 2023

(30) Foreign Application Priority Data
Mar. 27, 2020 (GB) .................................... 2004447

(51) Int. Cl.
*A61J 1/18* (2023.01)
*A61J 1/03* (2023.01)
*B65D 51/24* (2006.01)
*B65D 79/02* (2006.01)
*B65D 81/20* (2006.01)
*G01M 3/02* (2006.01)

(52) U.S. Cl.
CPC .................. *A61J 1/18* (2013.01); *A61J 1/035* (2013.01); *B65D 51/248* (2013.01); *B65D 79/02* (2013.01); *B65D 81/2076* (2013.01); *G01M 3/02* (2013.01); *A61J 2200/70* (2013.01)

(58) Field of Classification Search
CPC .......... A61J 1/18; A61J 2200/70; B65D 79/02
See application file for complete search history.

(56) References Cited

U.S. PATENT DOCUMENTS

| | | | |
|---|---|---|---|
| 4,098,577 A | 7/1978 | Halpern | |
| 2005/0022581 A1* | 2/2005 | Sunshine | G01N 29/2481 73/31.05 |
| 2015/0211955 A1* | 7/2015 | Bounouar | G01M 3/202 73/49.3 |
| 2017/0042237 A1 | 2/2017 | Murison et al. | |

FOREIGN PATENT DOCUMENTS

| | | | | |
|---|---|---|---|---|
| GB | 2564889 A * | 1/2019 | ............. | G01D 9/005 |
| SE | 1500408 A1 * | 4/2017 | | |
| WO | 2012/062015 A1 | 5/2012 | | |
| WO | WO-2014123463 A1 * | 8/2014 | ............. | B65D 79/02 |
| WO | WO-2018078441 A2 * | 5/2018 | ............. | A61J 1/1412 |
| WO | WO-2020046207 A1 * | 3/2020 | | |
| WO | 2020/198163 A1 | 10/2020 | | |

\* cited by examiner

*Primary Examiner* — Herbert K Roberts
(74) *Attorney, Agent, or Firm* — NIXON & VANDERHYE P.C.

(57) ABSTRACT

Packaging for a pharmaceutical product and a method of validating pharmaceuticals is disclosed. The packaging comprising a cavity; and validation circuitry comprising: a sensor adapted to output a signal in response to detecting a vapour in the cavity; and a detection circuit adapted to output an indication when the signal indicates a predefined vapour signature.

25 Claims, 10 Drawing Sheets

PACKAGING FOR A PHARMACEUTICAL PRODUCT

The present invention relates to low-cost printed sensors and other flex-electronics embedded into packaging for a pharmaceutical product.

A pharmaceutical product is counterfeit when there is a false representation in relation to its identity or source. This applies to the product, its container, or other packaging. Counterfeit medical products may include products with incorrect ingredients, without active ingredients, with incorrect amounts of active ingredients, or with fake packaging. Counterfeit medicines pose significant health risks to patients which may result in unnecessary morbidity and even mortality. Counterfeit drugs are of major concern both in developing and developed countries. In wealthier nations, new expensive lifestyle medicines, such as hormones, steroids, antihistamines, and erectile dysfunction drugs, are significant targets for counterfeiting.

In one example embodiment there is packaging for a pharmaceutical product comprising: a cavity; and validation circuitry comprising: a sensor adapted to output a signal in response to detecting a vapour in the cavity; and a detection circuit adapted to output an indication when the signal indicates a predefined vapour signature.

In another example embodiment there is a method of validating pharmaceuticals comprising: generating a signal in response to sensing a vapour in a cavity of packaging for a pharmaceutical product using a sensor; and indicating when the signal indicates a predefined vapour signature.

In another example embodiment there is packaging for a pharmaceutical product comprising: means for generating a signal in response to sensing a vapour in a cavity of packaging for a pharmaceutical product using sensor means; and means for indicating when the signal indicates a predefined vapour signature.

Figure 1A:
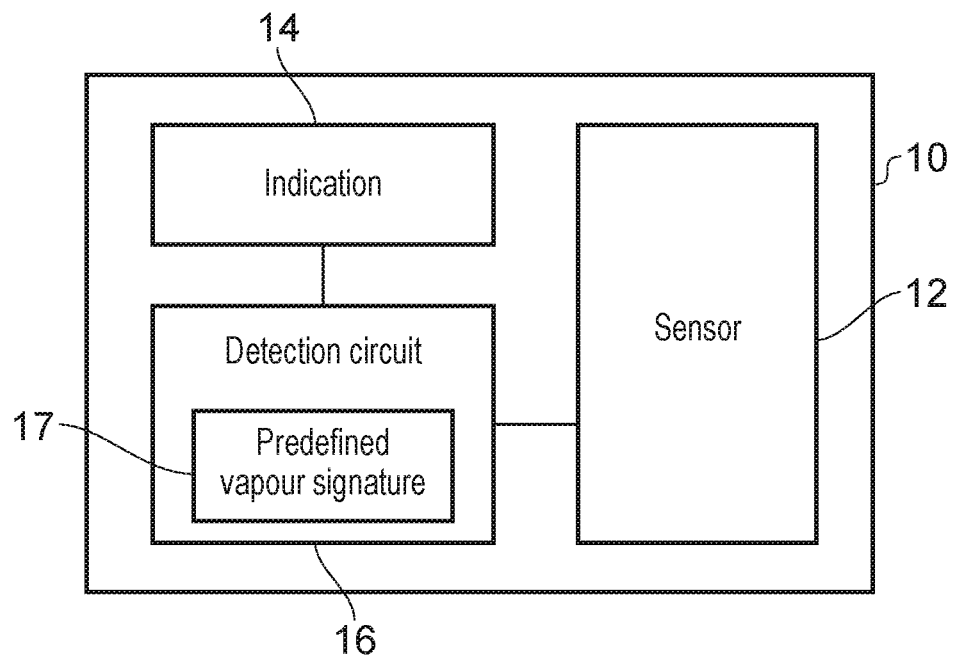
Figure 1B:
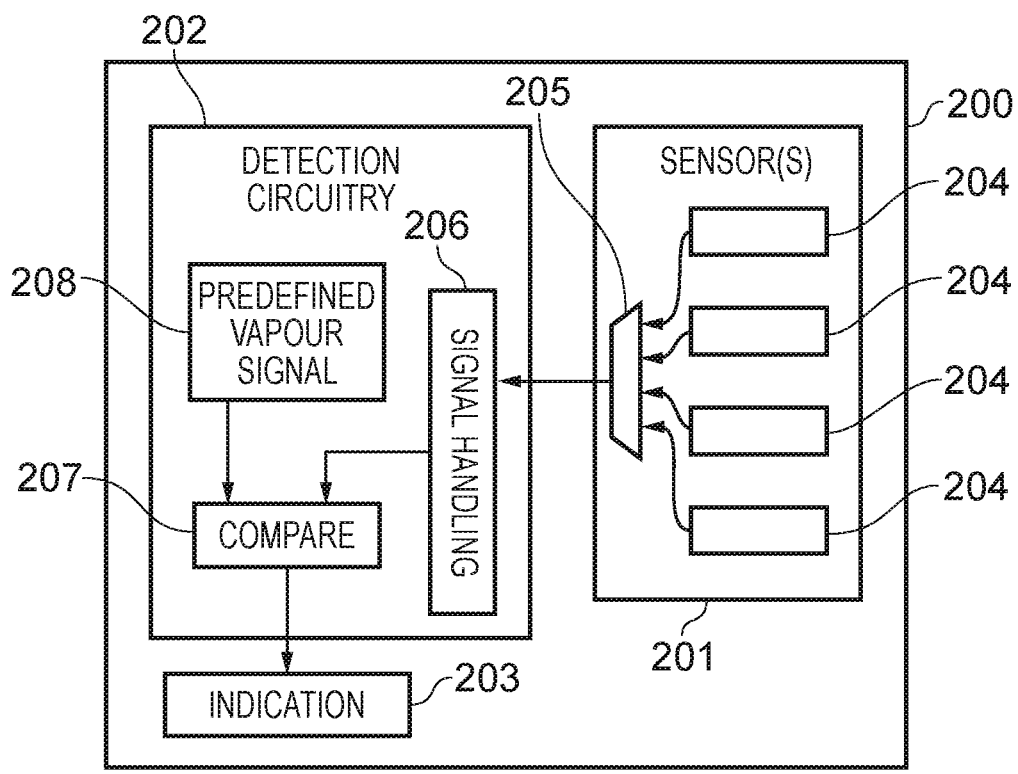
Figure 1C:
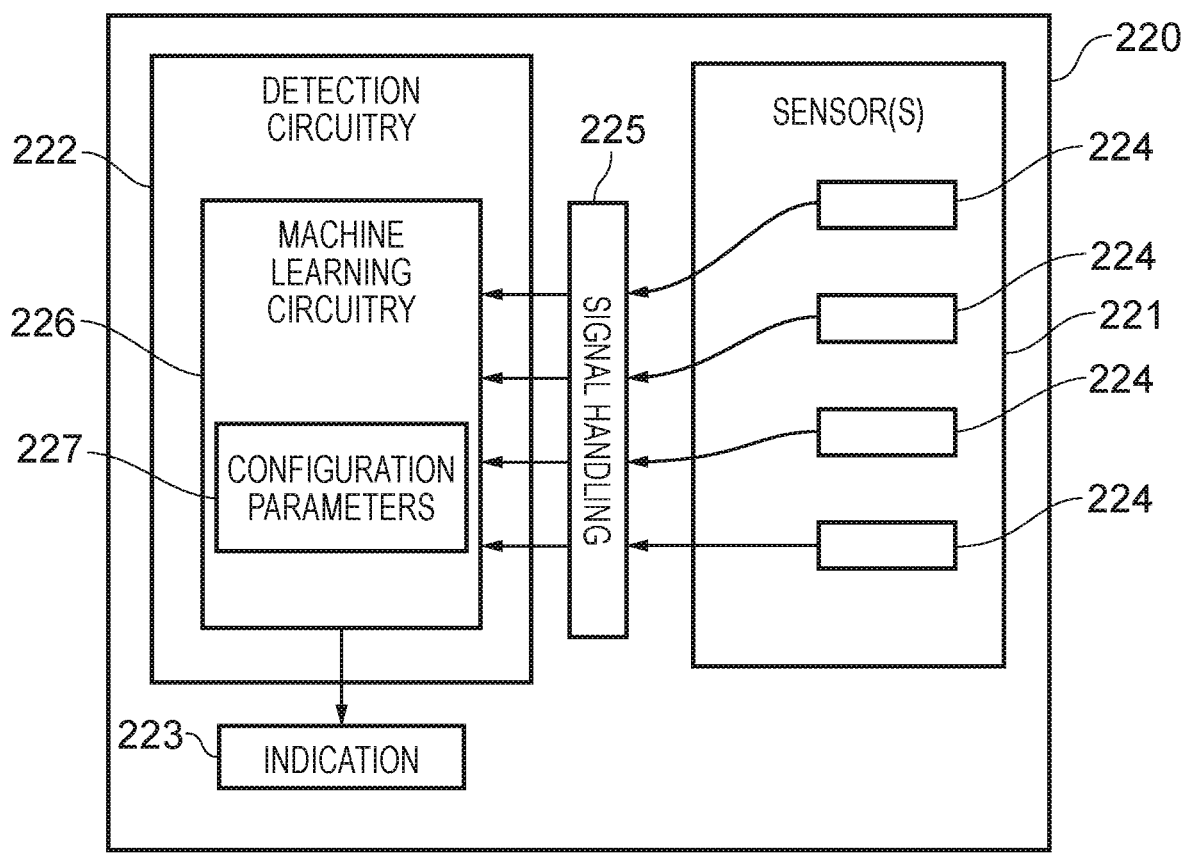
Figure 2:
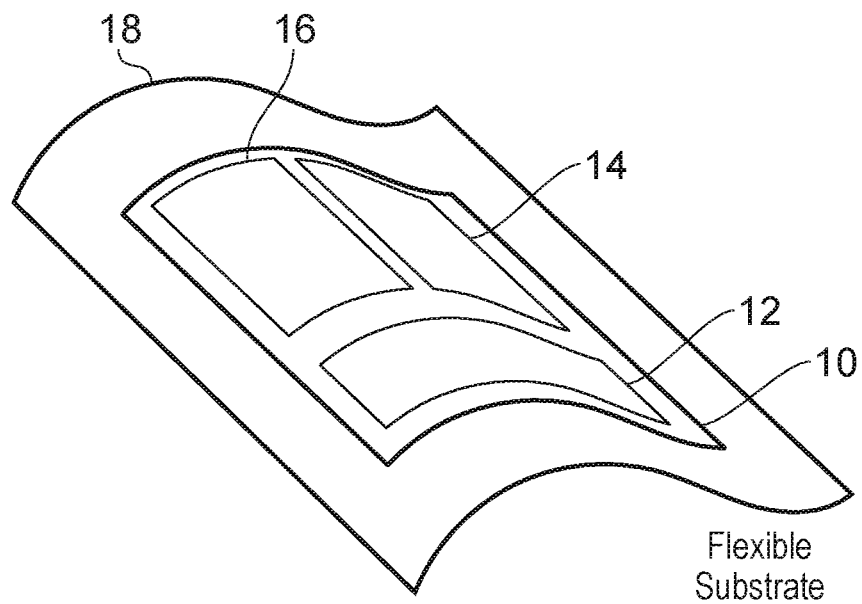
Figure 3:
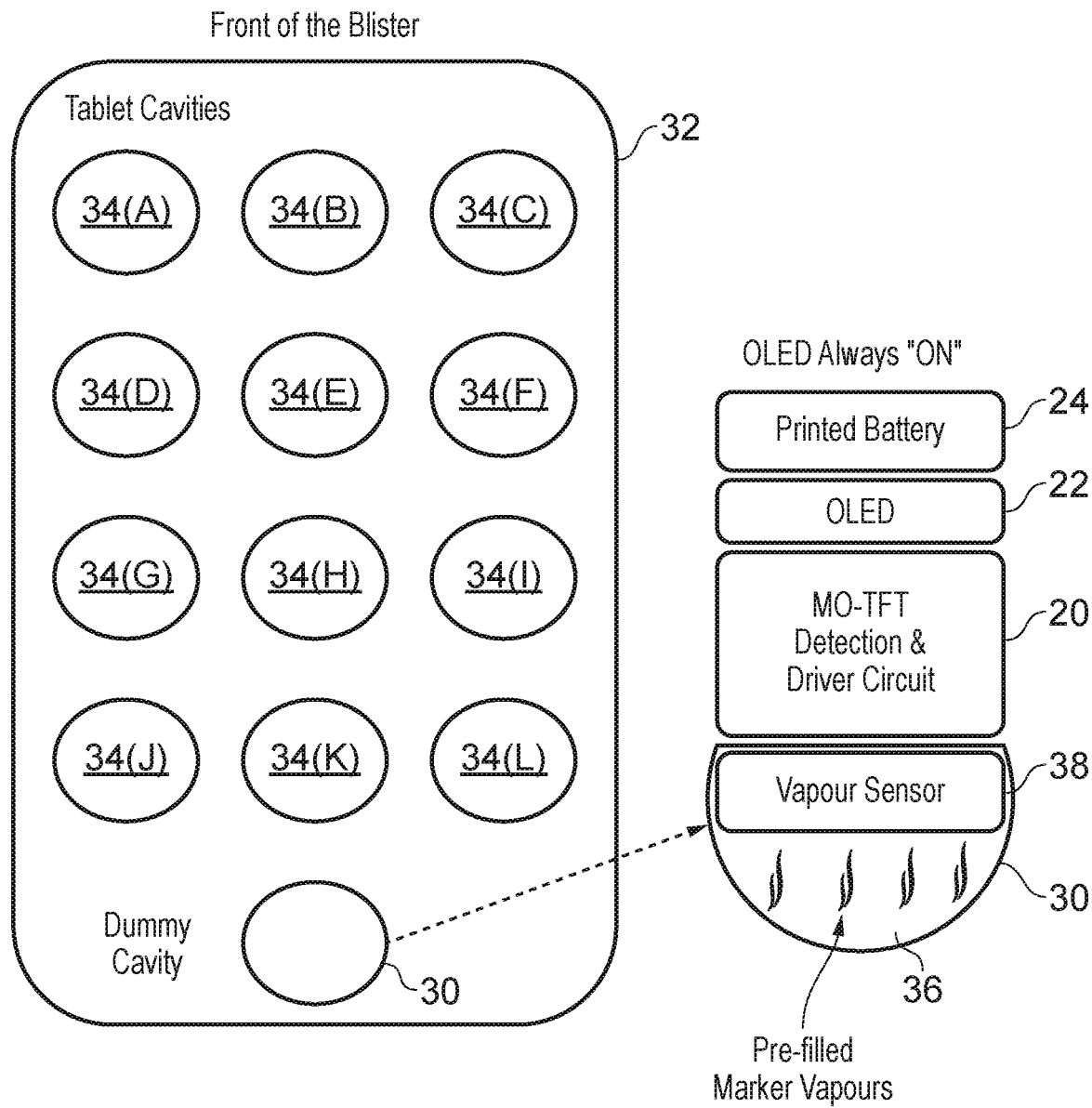
Figure 4:
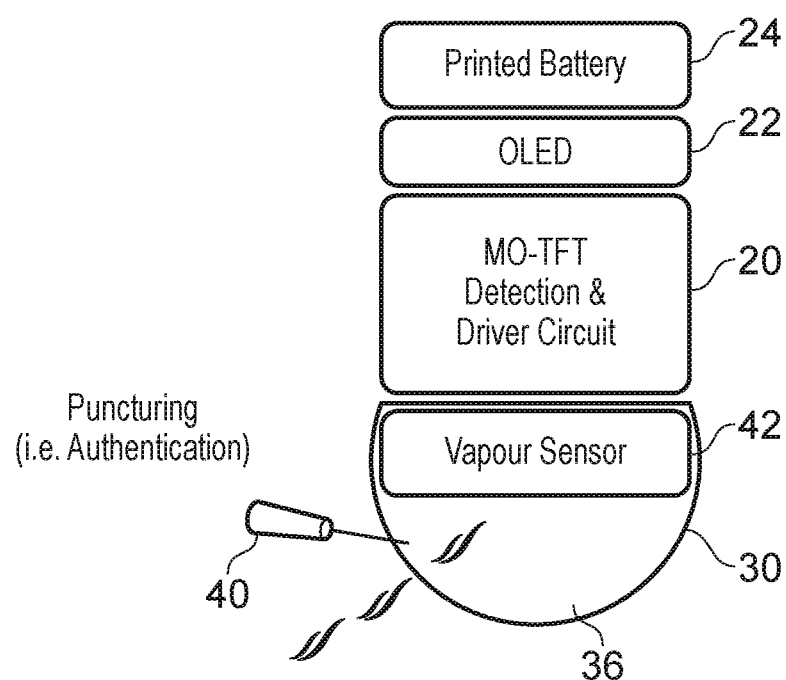
Figure 5:
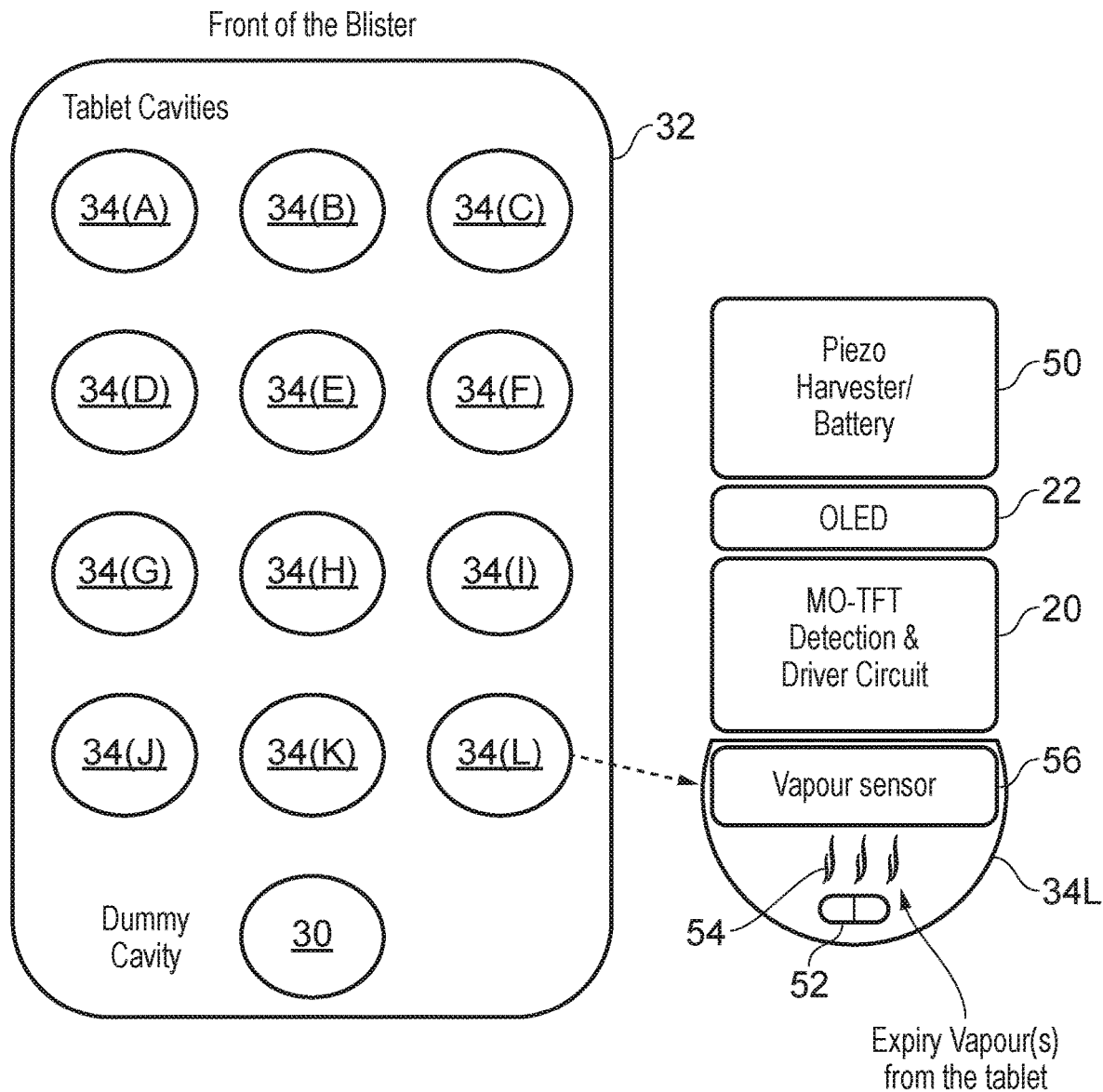
Figure 6:
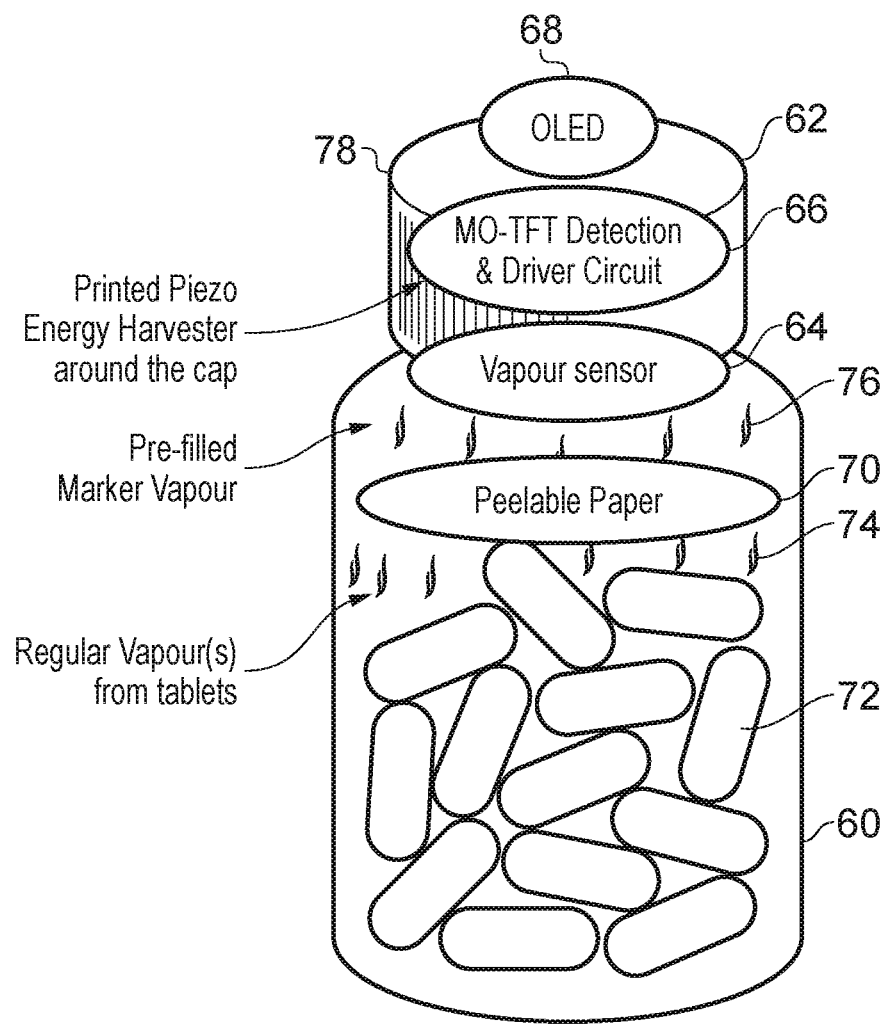
Figure 7:
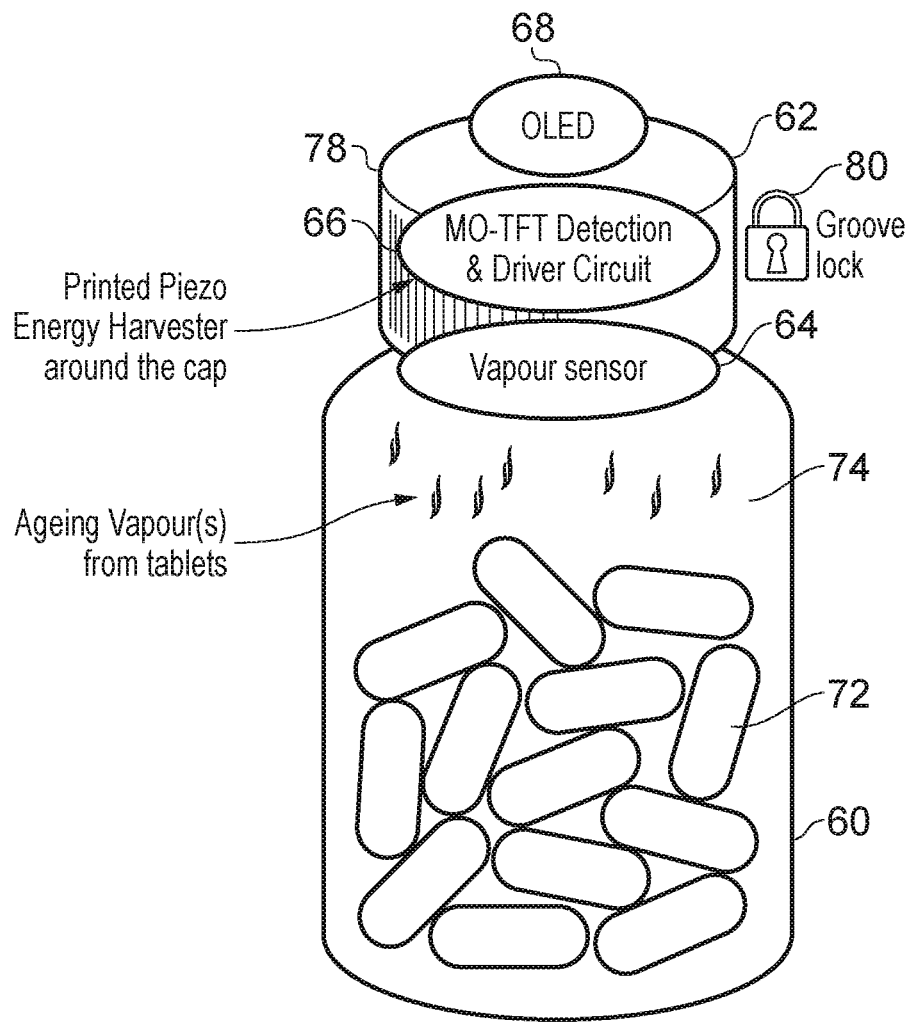
Figure 8:
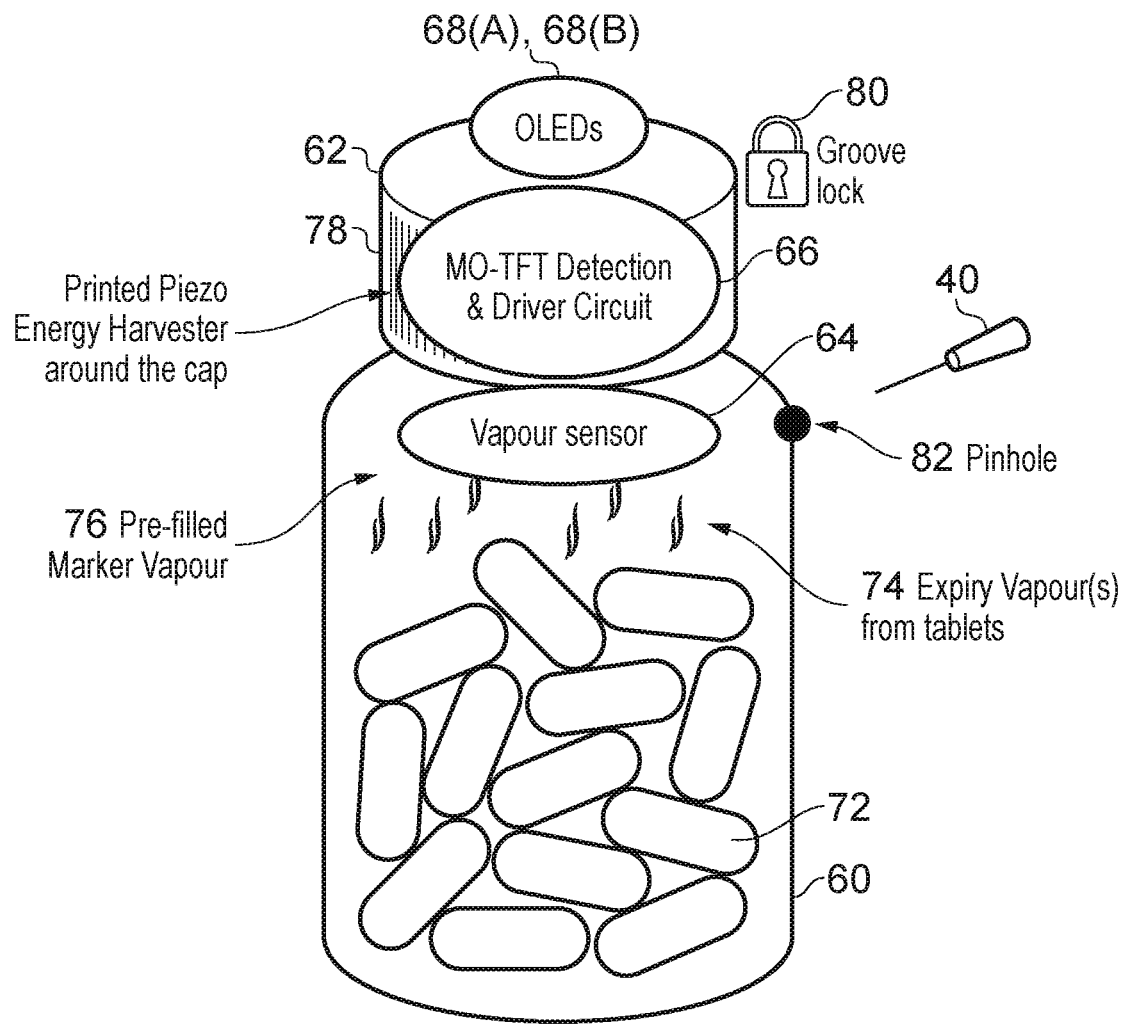
Figure 9:
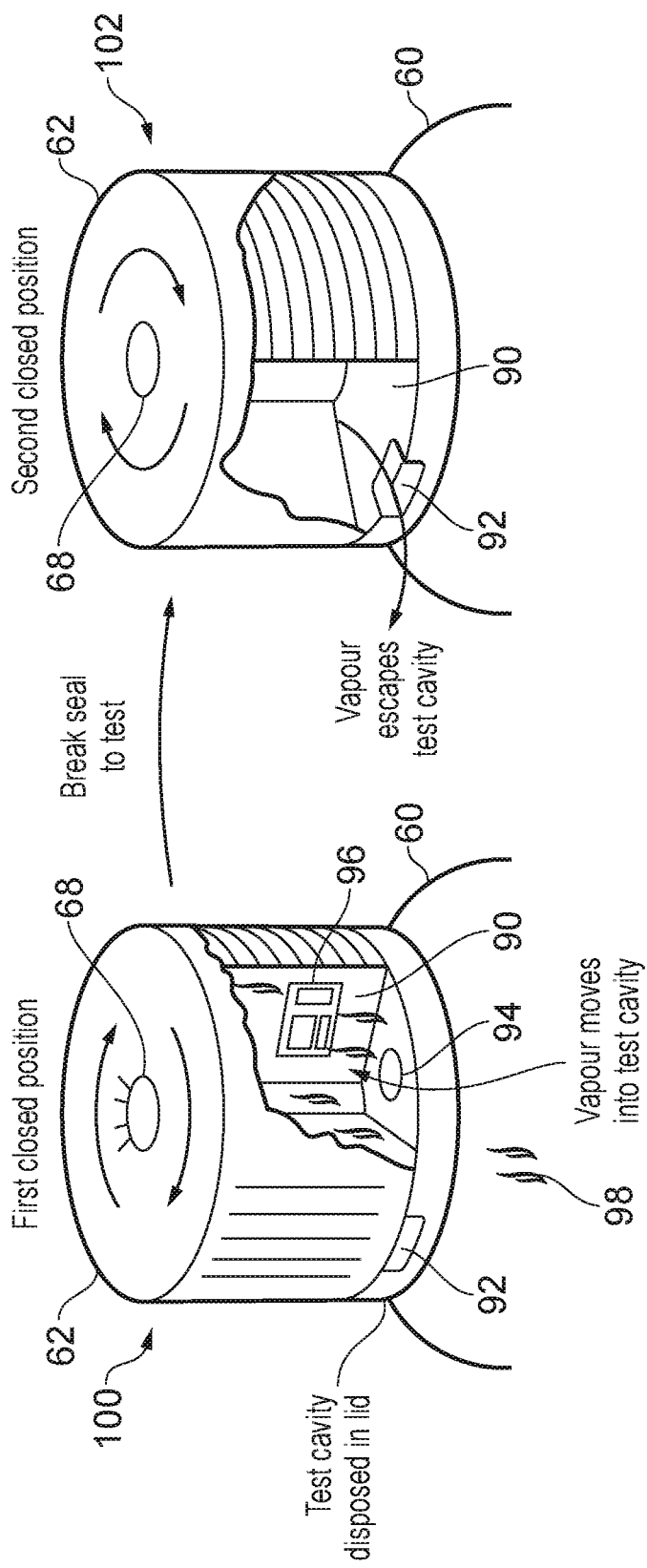
Figure 10:
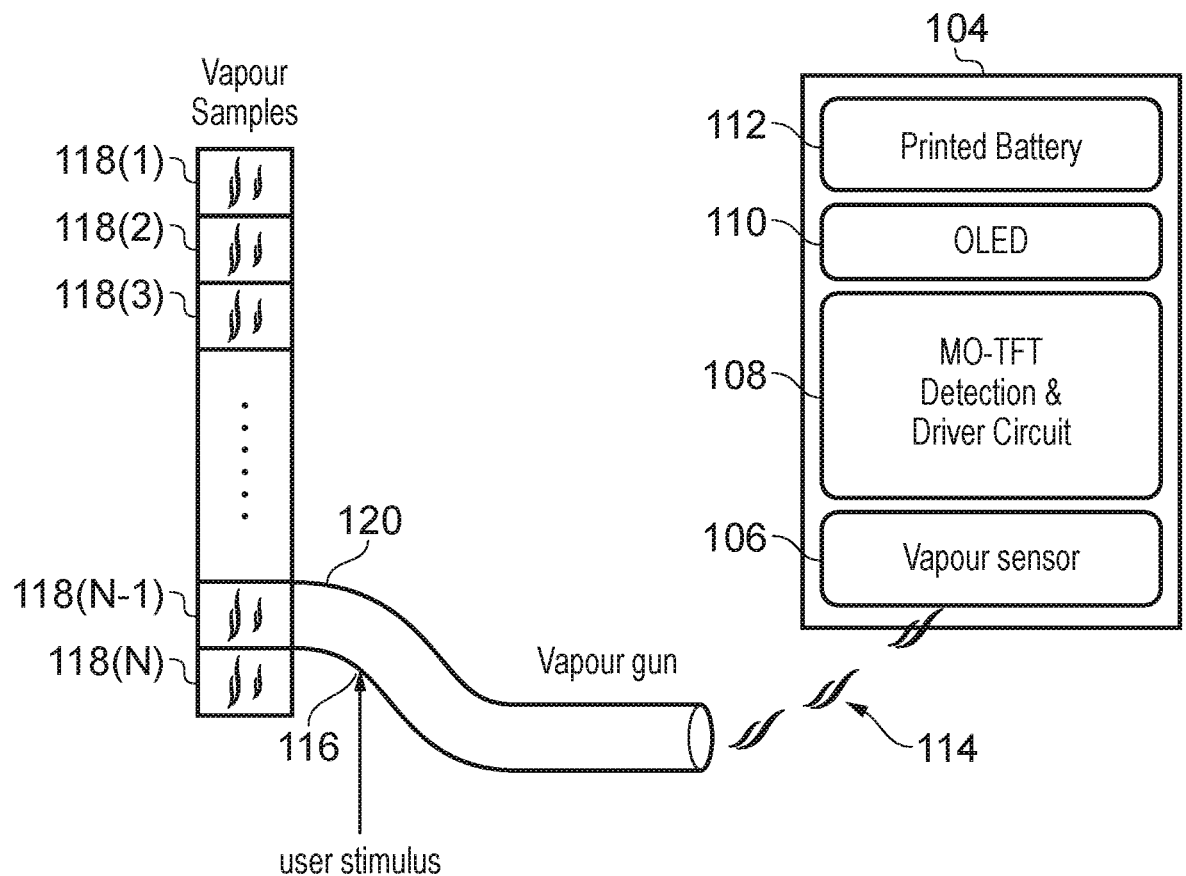
Figure 11:
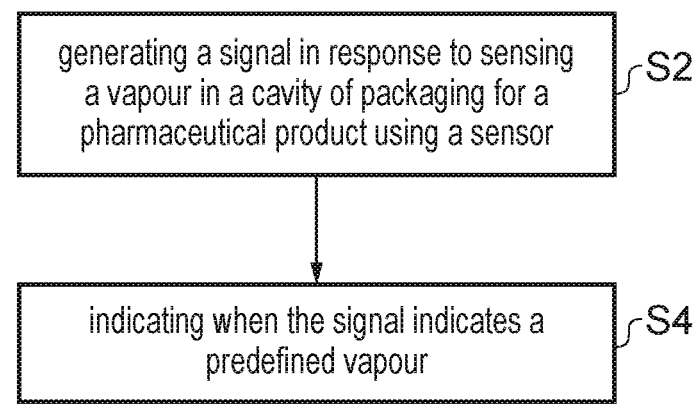

The present techniques will be described further, by way of example only, with reference to embodiments thereof as illustrated in the accompanying drawings, in which:

FIGS. 1A, 1B, and 1C schematically illustrate validation circuitry which may embody various examples of the present techniques;

FIG. 2 schematically illustrates validation circuitry embedded in a flexible substrate which may embody various examples of the present techniques;

FIG. 3 schematically illustrates a pharmaceutical blister package which may embody various examples of the present techniques;

FIG. 4 schematically illustrates a portion of a pharmaceutical blister package which may embody various examples of the present techniques;

FIG. 5 schematically illustrates a pharmaceutical blister package which may embody various examples of the present techniques;

FIG. 6 schematically illustrates a pharmaceutical container which may embody various examples of the present techniques;

FIG. 7 schematically illustrates a pharmaceutical container which may embody various examples of the present techniques;

FIG. 8 schematically illustrates a pharmaceutical container which may embody various examples of the present techniques;

FIG. 9 schematically illustrates the lid of a pharmaceutical container which may embody various examples of the present techniques;

FIG. 10 schematically illustrates a system comprising validation circuitry and a vapour gun which may embody various examples of the present techniques; and FIG. 11 shows a sequence of steps that are carried out by some embodiments of the present techniques.

At least some embodiments provide packaging for a pharmaceutical product comprising: a cavity; and validation circuitry comprising: a sensor adapted to output a signal in response to detecting a vapour in the cavity; and a detection circuit adapted to output an indication when the signal indicates a predefined vapour signature.

The packaging is a simple self-contained solution that does not need any other infrastructure to detect counterfeit or expired pharmaceutical products. The detection of counterfeit or expired pharmaceutical products is done by a sensor forming part of a cavity of the packaging, where the sensor is adapted to output a signal in response to detecting a vapour in the cavity. If the detection circuit recognises that the signal indicates a predefined vapour signature then an indication is output. By detecting the presence of a particular vapour the detection circuitry in combination with the sensor can be used to indicate one or more features of the pharmaceutical product. In some embodiments, the presence of a particular vapour indicates that the pharmaceutical product is a genuine pharmaceutical product. In some embodiments the presence of a particular vapour indicates that the pharmaceutical product has expired.

The vapour used is not limited and could be any chemical diffused or suspended in a gaseous phase. In some embodiments the vapour could be one or more condensable gases that are in a gaseous phase over a range of operating temperatures. The range of operating temperatures could comprise any range of temperatures at which the pharmaceutical product could for example be stored, transported, sold, and/or used. In some embodiments the vapour could comprise one or more vapours that are detectable using an electronic sensor. Such vapours could, for example, comprise odours which could also be detectable by the human nose but may also comprise odours that are not detectable by the human nose. In some embodiments the vapour may comprise one or more chemicals that are diffused or suspended within a gaseous phase. In some embodiments the vapour may comprise one or more volatile chemicals that are volatile at the temperatures and pressures under which the pharmaceutical product is stored, transported, sold, and/or used. The sensor could be adapted to output a signal in response to one or more physical, chemical or electrical properties of the vapour. In some embodiments the detection circuitry or the sensor could be generic sensors adapted to respond to one or a number of different vapours. In some embodiments, one or more of the configuration of the detection circuitry and the configuration of the sensor could be specific to the vapour.

The detection circuitry may be adapted to process the signal in order to output an indication when the signal indicates a predefined vapour signature. This processing could take a variety of forms, such as outputting a particular voltage or current when the sensor detects the presence of a vapour. In these embodiments the detection circuitry's action of determining if the signal corresponds to the predefined vapour signature may correspond to determining if the voltage or current from the sensor is substantially equal to a predetermined value. In other embodiments the detection circuitry is configured to perform signal processing to determine if a spectrum or range of voltages or currents output by the sensor comprises the predefined vapour signature. This analysis could involve signal processing for a signal output by the sensor in the time domain or the frequency domain.

Accordingly, in some embodiments the predefined vapour signature comprises at least one value stored in the validation circuitry and the detection circuitry is adapted to output the indication in dependence on a comparison based on the signal and the at least one stored value.

In some embodiments the detection circuitry comprises machine learning circuitry and the at least one stored value is generated and stored in a training procedure carried out by the machine learning circuitry. It will therefore be understood that the machine learning circuitry therefore firstly carries out a training procedure, which can then be followed by normal operation (i.e. to detect vapours). The configuration of the machine learning circuitry established in the training procedure then determines how the machine learning circuitry then behaves in normal operation and in particular when it will cause the detection circuit to output the indication, showing that a vapour which it has been trained to detect has been detected. It will be appreciated by the person skilled in the art that any form of machine learning algorithm could be used.

In some embodiments the validation circuitry comprises flexible electronics. Flexible electronics is the fabrication of electronic devices on flexible substrates, typically plastics, such as polyimide, but also on paper and is a low cost approach to circuit fabrication. Flexible electronics includes the printing/fabrication of Thin Film Transistors (TFTs) onto a flexible substrate. Using flexible electronics for the validation circuitry provides a low cost and versatile approach to fabricating the working components of the packaging.

The indication output by the detection circuit can take a number of forms. However, in some embodiments the indication is a visual indication. The visual indication may comprise any form of visual indication that the vapour signal corresponds to a predefined vapour signature. The visual indication may, for example, take the form of a Light Emitting Diode (LED), an Organic Light Emitting Diode (OLED), an ElectroChromic Display (ECD), or a Liquid Crystal Display (LCD). The visual display may take a first form when the indication is present and a second form when the indication is absent. In some embodiments the first form may comprise the visual indication being illuminated and the second form may comprise the visual indication not being illuminated. In other embodiments, the first value may comprise the visual indication being illuminated to a first brightness or to follow a first temporal illumination pattern and the second form may comprise the visual indication being illuminated to a second brightness or to follow a second temporal illumination pattern. In some embodiments the visual indication may take the form of a plurality of different optical elements. For example a first optical element may be illuminated when the indication is present and a second optical element may be illuminated when the indication is not present. It will be appreciated by the person skilled in the art that these are just examples and any form of visual indication may be used.

One option that fraudsters might consider is to fake the behaviour of the vapour sensor and provide only a visual indication that is hardwired to turn on when energy is supplied. Such a fake product might not comprise any vapour sensing and detection circuitry at all. Therefore, in some embodiments the detection circuit is adapted to not output the indication when the signal does not correspond to the predefined vapour signature. Hence, the indication corresponds to an indication as to whether the vapour that corresponds to the predefined vapour signature is detected in the cavity. In this case the pharmacy or customer who buys the pharmaceutical product can perform counterfeit testing by releasing the vapour from the packaging such that the vapour is no longer detected in the cavity and the indication would not be output. As discussed, the absence of the indication would result in a change in the visual indication.

In some embodiments, the sensor comprises at least one of a thin film transistor and a printed resistive sensor and in some embodiments the sensor comprises an array of sensors and the signal is comprised of a set of signals, wherein each of the set of signals is output in response to the vapour, and the detection circuit is adapted to output the indication when the set of signals corresponds to the predefined vapour signature. These embodiments provide flexibility in terms of the vapour signatures that can be detected. For example in some embodiments, the vapour could have a vapour signature that can be detected with a single sensor tuned to the specific vapour. In some embodiments the vapour could have a more complex vapour signature that requires a number of different sensors, each tuned to recognise a different part of the vapour signature. In such embodiments each sensor of the array of sensors may be configured to output a signal in response to any vapour and, in addition, each sensor may be tuned such that the signal output by each of the sensors in the array of sensors is indicative of a different component of the vapour detected by the sensor. Thus, the presence or absence of chemicals with more complex vapour signatures can be established.

In some embodiments the vapour is a marker vapour contained in the cavity. The marker vapour is a vapour chosen by the manufacturer and with a known vapour signature. The combination of a marker vapour with a known vapour signature and a sensor adapted to output a signal that indicates the known vapour signature in response to detecting the marker vapour in the cavity provides a system for reducing forgeries.

The packaging is not limited to the validation that a pharmaceutical product is genuine and in some embodiments the vapour is an expiry vapour released from the pharmaceutical product, where a release rate of the expiry vapour from the pharmaceutical product is dependent on the age of the pharmaceutical product. It is known that the vapours released by some pharmaceutical products change with time and indeed that the presence of some vapours may indicate that the pharmaceutical product is its expiry date or has expired completely. The provision of a sensor that is tuned to output a known vapour signature in response to detecting an expiry vapour can be used to indicate to the pharmacy or consumer that the pharmaceutical products have expired and may no longer be safe or effective.

In some embodiments the predefined vapour signature comprises a minimum vapour concentration of the expiry vapour. In some cases the expiry of the pharmaceutical product may be rapid and occur in a number of hours. In other cases the expiry may be a much more gradual process, for example, taking a number of days, weeks, or months. During this time it may be that the pharmaceutical product is still safe and effective, even though a small quantity of the expiry vapour may be present and detected in the cavity. By requiring that the predefined vapour signature comprises a minimum vapour concentration it is possible to define a point at which the pharmaceutical product is considered to have expired based on a concentration of the expiry vapour in the cavity. In some embodiments the determination of a minimum vapour concentration may be relative to a known concentration of a second vapour where the second vapour, may be detected by the sensor or by a second sensor. In alternative embodiments the determination of a minimum vapour concentration may be an absolute measurement determined by a magnitude of the expiry vapour signature within the signal output by the sensor.

The type of packaging is not limited. In some embodiments the packaging is a blister pack and the cavity is a dummy cavity that does not contain the pharmaceutical product. The blister pack may contain any number of cavities that contain the pharmaceutical product and a dummy cavity. In some embodiments the dummy cavity may be prefilled with a predetermined amount of a marker vapour. In these embodiments the pharmaceutical product may for example be pills or capsules. However, the pharmaceutical product could be any pharmaceutical product that could be contained within a blister pack.

In some embodiments the packaging is a blister pack and the pharmaceutical product is contained in the cavity. The cavity may also contain a predetermined amount of a marker vapour. In some embodiments the cavity may contain a sensor that is configured to output a signal in response to detecting the marker vapour in the cavity. In other embodiments the cavity may contain a sensor that is configured to output a signal in response to detecting the expiry vapour in the cavity. In yet further embodiments the cavity may contain a sensor that is configured to output a first signal in response to detecting the marker vapour in the cavity and a second signal in response to detecting the expiry vapour in the cavity. Such embodiments can provide both validation that the pharmaceutical product is genuine and that the pharmaceutical product has not expired. The blister pack may contain any number of cavities in which the pharmaceutical product is contained and for which a sensor is adapted to output a signal in response to detecting a vapour in the cavity. In addition, the blister pack may also contain any number of pharmaceutical containing cavities that do not contain a sensor adapted to output a signal in response to detecting a vapour. In some embodiments the blister pack may contain a number of cavities N for which only a subset of cavities M (where M≤N) are cavities for which a sensor is adapted to output a signal in response to detecting a vapour therein. In some embodiments M may be equal to 1. In such embodiments, where the sensor or sensors are adapted to detect an expiry vapour in addition to or instead of a marker vapour it is assumed that the pharmaceutical products contained in the individual cavities will expire at substantially the same time.

In some embodiments the sensor is one of a plurality of sensors, and each of the plurality of sensors is adapted to output the signal in response to detecting the vapour in one of a plurality of cavities. The plurality of sensors may be disposed in M of the N cavities where, in some embodiments, M is greater than half of N and, in other embodiments, M may be equal to N. In such embodiments where the sensor is adapted to detect an expiry vapour, in addition to or instead of a marker vapour, it is possible to determine which of the cavities contain a pharmaceutical product that has expired and which of the cavities contain a pharmaceutical product that has not expired. Such embodiments may incur a higher manufacturing cost but, in cases for which the expiry date of the pharmaceutical products can vary substantially, would result in fewer wasted pharmaceutical products.

In some embodiments the cavity is adapted to release the vapour in response to the cavity being breached. The cavity could be breached through piercing with an object or, when the cavity is a pharmaceutical containing cavity, through the removal of the pharmaceutical product. In such embodiments, when the cavity is breached the sensor would no longer detect the presence of the vapour and would no longer output a single corresponding to the predefined vapour signature. In some embodiments, where the detection circuitry is adapted not to output the indication when the signal does not correspond to the predefined vapour signature, the validation circuitry would not output an indication. Where the predefined vapour signature corresponds to a marker vapour the pharmacy or customer could use this mechanism to verify that the pharmaceutical product is genuine. In particular, the pharmacy or customer could determine whether the indication is output prior to the cavity being breached and whether the indication is no longer output in response to the cavity being breached. The combination of an indication output prior to the cavity being breached and the indication no longer being output in response to the cavity being breached indicates to the pharmacist or customer that the pharmaceutical product is genuine.

In some embodiments the packaging comprises a bottle that contains the pharmaceutical product. In these embodiments the pharmaceutical product could be one or more of pills, capsules, and liquid medicines. However, the person skilled in the art will recognise that this list is not limiting and that the pharmaceutical product could be any pharmaceutical product that could be contained within a bottle. In some embodiments the cavity may comprise the entire space inside of the bottle sealed by a lid, and in other embodiments the cavity may be a separate cavity formed within the bottle or attached to the bottle.

In some embodiments the bottle comprises a lid and the lid comprises the validation circuitry. Fabricating the lid to comprise the validation circuitry removes the need for the circuitry to be embedded into the bottle. As a result standard glass bottles can be used and recycled without modification.

When the vapour is an expiry vapour it may be desirable to prevent the customer from easily being able to access the contents of the bottle. Therefore, in some embodiments the lid of the bottle comprises a lock mechanism having an unlocked state and a locked state, and wherein the lock mechanism is adapted to enter the locked state in response to the indication. When the detection circuit detects that the cavity contains the expiry vapour then it is determined that the pharmaceutical product may be unsafe or ineffective. In such a situation the lid of the bottle responds to the indication of the presence of the expiry vapour by entering a locked state. This prevents pharmacies or customers from easily accessing the pharmaceutical product which may be harmful or ineffective after expiry.

It may not always be desirable to have a marker volatile in direct contact with a pharmaceutical product for a prolonged period of time. In addition, it may not be desirable to have to fill a relatively large void space within the bottle with a marker vapour. Hence, in some embodiments the pharmaceutical product is separated from the marker vapour by a removable layer. In some embodiments, the removable layer may be placed such that the pharmaceutical product is placed between the lid and the removable layer. In other embodiments, the removable layer may be placed such that the marker vapour is placed between the lid and the removable layer. In these embodiments, once the lid has been opened, the marker vapour will disperse allowing the pharmacist or customer to validate that the pharmaceutical product is genuine. At this point the removable layer can be removed by a pharmacist or customer to access the pharmaceutical product. The removable layer could cover the top of the bottle such that the marker volatile is only contained in the relatively small space between the rim of the bottle and the lid.

In some embodiments the bottle is adapted to release the marker vapour from the cavity in response to the lid being opened. The lid may have an air-tight factory seal that prevents the marker vapour from being released. Once the lid is opened for the first time the factory seal is broken and the marker vapour is released. This mechanism allows the user to validate that the pharmaceutical products are genuine without the need to perform additional steps which could introduce user error.

In some embodiments the bottle comprises a test spot adapted to release the marker vapour from the cavity in response to the cavity being breached. The test spot could be a specific part of the bottle which is designed to be pierced in order to release the marker vapour. The test spot could be incorporated above or below a removable layer used to separate the pharmaceutical product from the marker vapour. Breaching the test spot could create an opening into the bottle or could create an opening into a cavity contained within the bottle but sealed from the pharmaceutical containing product. In alternative embodiments the test spot could comprise a self-sealing valve embedded in the bottle which is breached by piercing with a hollow needle. The marker vapour could then exit through the hollow needle to allow the validity of the pharmaceutical products to be determined. Once the hollow needle is removed the self-sealing valve would reseal resulting in a sealed container for the pharmaceutical product.

In some embodiments the cavity is a test cavity disposed in a lid comprising an inlet and an outlet, wherein the lid is adapted such that when in a first closed position the test cavity is in fluid connection with an interior of the bottle and is sealed from an exterior of the bottle, wherein the lid is adapted such that when in a second closed position the test cavity is sealed from the interior of the bottle and is in fluid connection with the exterior of the bottle, and wherein the lid is adapted such that when the lid is moved from the first closed position to the second closed position the vapour is released from the test cavity. On leaving the factory the lid may be sealed in the first sealed position by a factory seal. In such a position the marker vapour is present in the test cavity and the bottle. When the pharmacist or customer opens the lid the factory seal may be broken allowing the lid to move into the second closed position. This would allow the marker vapour that is in the test cavity to exit the test cavity allowing the pharmaceutical product to be validated. Any marker vapour that is still present in the bottle would remain in the bottle and be sealed from the test cavity and the outside. This mechanism would allow the pharmaceutical product to be validated repeatedly by twisting the lid back to the first closed position to allow a second quantity of the marker vapour to flow into the test cavity. In some embodiments the movement of the lid from the first closed position to the second closed position may be achieved by rotating the lid in a first direction and the lid may be unscrewed fully by rotating the lid in a second direction. In some embodiments the first direction is the second direction, yet in other embodiments the first direction is opposite to the second direction. In some embodiments the test cavity, when in the first closed position, may be sealed from both the inside and the outside of a bottle. Such a mechanism would allow the pharmaceutical product to be validated a single time, but would not allow the pharmaceutical product to be repeatedly validated.

In some embodiments the validation circuitry comprises a power source. The power source may take a number of forms including, but not limited to, batteries, energy harvesters, and photovoltaic cells. In some embodiments the power source is a printed power source printed onto a flexible substrate. The printed power source can take a number of different forms, but in some embodiments printed power source is a printed battery. In other embodiments the printed power source is an energy harvester. The energy harvester can take a number of forms including, but not limited to, a photovoltaic energy harvester, a piezoelectric energy harvester, a pyroelectric energy harvester, and an electrostatic energy harvester.

The above techniques provide the means to validate whether a packaged pharmaceutical product is genuine. However, in some cases sophisticated fraudsters may analyse the original vapour in the cavity using advanced analytical techniques and expensive lab equipment and reproduce them. Such fraudsters may also have access to printable or flexible electronics assembly and manufacturing facilities to manufacture custom sensors responsive to the original vapours or their own vapours. Using these technologies sophisticated fraudsters could assemble the components on counterfeit packaging along with the reverse-engineered vapours. Such facilities might allow these fraudsters work around the above described techniques. Hence, in some embodiments there is provided a system comprising: the packaging of the pharmaceutical product; and a vapour gun containing a preselected test vapour, wherein the vapour gun is adapted to output a quantity of the preselected test vapour in response to a user stimulus, wherein the detection circuitry is adapted to output the indication when the signal indicates the preselected test vapour is in the cavity. The vapour gun is a trusted source that contains the preselected test vapour from a manufacturer. The user, who in this case is normally a pharmacist, would use the vapour gun to blow the vapour onto the sensor on the packaging. If the product is genuine, the sensor would recognise the vapour and output the indication. By regularly changing the marker vapour used to indicate that the pharmaceutical product is genuine the pharmaceutical product can be validated even against sophisticated fraudsters.

In some embodiments the vapour gun further comprises a plurality of test vapours comprising the preselected test vapour and is adapted to output one of the plurality of test vapours in response to a user selection. In this way a single vapour gun can be provided that enables the user, who in this case is normally a pharmacist, to test a range of different pharmaceutical products which may each be provided with a different unique vapour with a different unique vapour signature.

In some embodiments the plurality of test vapours comprises the predefined vapour signature. In this way the vapour test gun, in combination with the packaging allows the user to test the functioning of the validation circuitry. If the validation circuitry is genuine then the indication will be output when the vapour gun is used to blow the vapour onto the sensor. If the validation circuitry is counterfeit then the counterfeit validation circuitry will not respond to the test vapour in the test gun and will not output the indication.

At least some embodiments provide a method of validating pharmaceuticals comprising: generating a signal in response to sensing a vapour in a cavity of packaging for a pharmaceutical product using a sensor; and indicating when the signal indicates a predefined vapour signature.

At least some embodiments provide packaging for a pharmaceutical product comprising: means for generating a signal in response to sensing a vapour in a cavity of packaging for a pharmaceutical product using sensor means; and means for indicating when the signal indicates a predefined vapour signature.

Some particular embodiments are now described with reference to the figures.

FIG. 1A schematically illustrates validation circuitry which may embody various examples of the present techniques. Validation circuitry 10 is configured to provide validation that a pharmaceutical product is genuine. The validation circuitry 10 comprises sensor 12, detection circuitry 16 and an indication 14. The sensor 12 could be any type of sensor that can detect a vapour. The sensor 12 could be an electrochemical sensor, a biosensor, a photoionisation sensor, an infrared point sensor, an infrared imaging sensor or a semiconductor sensor. The sensor could take the form of a single sensor or could take the form of an array of sensors. In particular, semiconductor sensors could take the form of a single TFT or an array of TFTs. This list of sensor types is non-exhaustive and the person skilled in the art would recognise that any type of sensor capable of detecting a vapour could be used. The detection circuitry 16 is configured to identify a predefined vapour signature 17. The sensor 12 is adapted to output a signal in response to detecting a vapour. The sensor 12 is coupled to detection circuitry 16 which performs processing to determine if the signal output by the sensor 12 corresponds to the predefined vapour signature 17. This processing could take a variety of forms. In some embodiments the sensor 12 is adapted to output a particular voltage or current when the sensor 12 detects the presence of a vapour. In these embodiments the detection circuitry 16 step of determining if the signal corresponds to the predefined vapour signature 17 corresponds to determining if the voltage or current from the sensor 12 is substantially equal to a predetermined value. In other embodiments the detection circuitry 16 is configured to perform signal processing to determine if a spectrum or range of voltages or currents output by the sensor 12 comprises the predefined vapour signature 17. This analysis could involve signal processing for a signal output by the sensor 12 in the time domain, the frequency domain, or could be based on a number of signals output from a range of different TFTs that comprise the sensor 12.

FIGS. 1B and 1C schematically illustrate two example configurations of validation circuitry according to some embodiments. FIG. 1B shows validation circuitry 200 which comprises sensor(s) 201, detection circuitry 202 and an indication 203. The sensor(s) 201 are shown in this example to comprise four individual sensors 204 which are each responsive to different chemicals or chemical mixtures. As in the case of FIG. 1A these sensors could be any type of sensor that can detect a vapour. The outputs of these sensors 204 are brought together by the gate 205, which passes them to the detection circuitry 202. The detection circuitry 202 comprises signal handling circuitry 206, which processes the signals into a format appropriate for the comparison to be carried out, and these are then received by the comparison circuitry 207. The comparison circuitry 207 also receives one or more values corresponding to a predetermined vapour signal 208 which are stored in the detection circuitry. On the basis of the comparison, the comparison circuitry will generate the indication 203, in dependence on whether the sensors signals received correspond to the one or more values stored. Note that the comparison may take various forms and, for a positive identification, may allow for a certain variation in the sensors signals received with respect to the one or more values stored.

FIG. 1C shows validation circuitry 220 which comprises sensor(s) 221, detection circuitry 222 and an indication 223. The sensor(s) 221 are also shown in this example to comprise four individual sensors 224 which are each responsive to different chemicals or chemical mixtures. As in the case of FIGS. 1A and 1B these sensors could be any type of sensor that can detect a vapour. The outputs of these sensors 224 are passed to signal handling circuitry 225, which processes the signals into a format appropriate to provide the inputs for the machine learning circuitry 226. The machine learning circuitry 226 is arranged to participate in a training procedure, when the configuration parameters 227 within it are tuned such that the desired vapour detection can be performed. The machine learning circuitry 226 is also arranged to then perform its normal operation, when the trained configuration parameters 227 within it determine its response to a given set of inputs, and in particular whether it judges them to indicate that the sensor signals received indicate that a vapour it has trained to detect has been detected. Hence in such a machine learning embodiment the configuration parameters 227 define the predefined vapour signature.

In the training procedure of the FIG. 1C validation circuitry, the predefined vapour signature may be derived from one or more vapour samples, where a plurality of signals relating to the one or more vapour samples are measured by the sensors 221. Multiple training iterations may be employed corresponding to a range of different temperatures, concentrations, pressures, and the presence of a range of different ambient vapours so that the detection circuitry 222 may then in operation robustly detect the desired vapours.

FIG. 2 schematically illustrates validation circuitry embedded in a flexible substrate which may embody various examples of the present techniques. The validation circuitry 10 is embedded onto a flexible substrate 18 such as polyimide. Flexible electronics is a technology for fabricating electronic circuits on flexible substrates. The validation circuitry 10 fabricated onto the flexible substrate 18 may comprise any embodiment disclosed in relation to validation circuitry described herein. In the illustrated embodiment the validation circuitry 10 comprises sensor 12, detection circuitry 16, and indication 14.

FIG. 3 schematically illustrates packaging which may embody various examples of the present techniques. In this embodiment blister pack 32 comprises a number of pharmaceutical containing cavities 34 and a dummy cavity 30. The dummy cavity 30 does not contain the pharmaceutical product, but instead contains a vapour, which in this embodiment is a pre-filled marker vapour 36. A sensor 38 is disposed in the cavity 30 and is connected to detection circuitry 20, printed battery 24, and an indication which in this case takes the form of a visual indication provided by OLED 22. It is noted that OLED 22 is only provided as an example of a visual indication and the person skilled in the art will understand that any indication could be used. The printed battery 24 provides power to the detection circuitry 20, sensor 38, and OLED 22. The printed battery 24 is only provided as an example. It is noted that any alternative power source could be used including, but not limited to, an energy harvester and a conventional battery. In response to detecting the marker vapour 36 in the cavity 30, the sensor 38 is adapted to output a signal. The detection circuitry 20 is adapted to output an indication when the signal indicates that the marker vapour 36 that is detected by the sensor 38 corresponds to the predefined vapour signature. The indication in this case is a visual indication provided by OLED 22, which indicates the presence of the pre-filled marker vapour 36 in the cavity 30. In some embodiments the indication comprises the OLED 22 being illuminated to indicate the presence of the pre-filled marker vapour 36.

The embodiment in FIG. 3 illustrates an example in which the dummy cavity 30 comprises the sensor 38. In other embodiments additional sensors 38 may be disposed in any number of the pharmaceutical containing cavities 34. In some embodiments all pharmaceutical containing cavities 34 contain a sensor 38. In other embodiments only a subset of pharmaceutical containing cavities 34 contain a sensor 38. In one illustrative embodiment pharmaceutical containing cavities 34(B), 34(E), 34(H) and 34(K) contain sensors 38 and are pre-filled with a marker vapour 36 in addition to the pharmaceutical product. It will be recognised by the person skilled in the art that this choice of pharmaceutical containing cavities is purely illustrative and that any subset of pharmaceutical containing cavities could be chosen to contain the pre-filled marker vapour 36 in addition to the pharmaceutical product. In some embodiments there is provided a single detection circuit 20 coupled to the plurality of sensors 38 disposed in the pharmaceutical containing cavities 34. In other embodiments there may be a plurality of detection circuits 20 each connected to a different sensor 38 in one of the pharmaceutical containing cavities 34. In some embodiments there is provided a single power source, which in this case is a printed battery 24, coupled to the one or more detection circuits 20 and the plurality of sensors 38 disposed in the pharmaceutical containing cavities 34. In other embodiments there may be a plurality of power sources, which in this case are printed batteries 24, coupled to the one or more detection circuits 20 and the plurality of sensors 38 disposed in the pharmaceutical containing cavities 34.

FIG. 4 schematically illustrates packaging which may embody various examples of the present techniques. FIG. 4 illustrates a single cavity 30 comprising a sensor 42 and prefilled with a marker vapour 36. The sensor is connected to the detection circuitry 20, the indication, which in this case is a visual indication comprising an OLED 22, and a printed battery 24. As described in relation to FIG. 3, the sensor 42 outputs a signal in response to detecting the marker vapour 36 in the cavity 30. The detection circuit 20 is configured to output an indication, which in this case is a visual indication provided by OLED 22, in response to determining that the signal corresponds to a predefined vapour signature. Piercing member 40 is used to breach the cavity 30 thereby releasing the marker vapour 36. Piercing member 40 can take a number of different forms. For example, in some embodiments the piercing member 40 could be a sharp object such as a pin or a needle. In other embodiments the piercing member could be the finger of the consumer and the breaching of the cavity 30 is achieved in the same way that a pharmaceutical product would be released from one of the pharmaceutical containing cavities 34. The person skilled in the art will recognise that any device or method of piercing could be used to achieve the breaching of the cavity 30. Once the cavity 30 has been breached by piercing member 40 the marker vapour 36 is released from the cavity 30. As a result the sensor 42 no longer detects the marker vapour 36 in the cavity and no longer outputs the signal. In response the detection circuitry 20 is no longer able to identify that the signal indicates a predefined vapour signal and ceases to output the indication which indicates to the consumer that the pharmaceutical product is genuine. In some embodiments the detection circuitry 20 ceasing to output the signal corresponds to the OLED 22 turning off. In other embodiments the OLED 22 may be off when the marker vapour 36 is detected in the cavity 30 and on when the marker vapour 36 is not detected in the cavity 30. In further embodiments the indication may be any form of visual indication where an element visually changes in response to the detection circuitry 20 ceasing to output an indication.

FIG. 5 schematically illustrates packaging which may embody various examples of the present techniques. In this embodiment blister pack 32 comprises a number of pharmaceutical containing cavities 34, each of which contain a pharmaceutical product 52, and a dummy cavity 30. The dummy cavity 30 does not contain the pharmaceutical product, but in some embodiments may contain a pre-filled marker vapour as discussed in relation to FIG. 3. At least one sensor 56 is disposed in at least a subset of the pharmaceutical containing cavities 34 and the at least one sensor 56 is connected to detection circuitry 20, battery/energy harvester 50, and an indication, which in this case takes the form of a visual indication provided by OLED 22. It is noted that OLED 22 is only provided as an example of a visual indication and the person skilled in the art will understand that any indication could be used. The battery/energy harvester 50 provides power to the detection circuitry 20, sensor 56, and OLED 22.

In this example embodiment, the sensor 56 is disposed in the pharmaceutical containing cavity 34(L) and is configured to output a signal in response to detecting an expiry vapour 54 in the pharmaceutical containing cavity 34(L). When the pharmaceutical product 52 has not expired it will not produce significant quantities of the expiry vapour 54 and the sensor 56 will not output a signal as a result. As the pharmaceutical product 52 ages it begins to release expiry vapour 54 into the pharmaceutical containing cavity 34(L). In response to detecting the expiry vapour 54 in the pharmaceutical containing cavity 34(L) the sensor 56 is configured to output a signal. In some embodiments a threshold amount of the expiry vapour 54 may need to be detected in order for the sensor 56 to output the signal. In response to detecting that the signal indicates the presence of the expiry vapour 54 in the cavity 34(L) the detection circuitry 20 is configured to output an indication. In the embodiment illustrated in FIG. 5 the indication is a visual indication comprising an OLED 22. As a result, when the pharmaceutical product 52 expires it release expiry vapour 54 which causes the sensor 56 to output a signal to the detection circuitry 20 which in turn causes a visual indication to inform the consumer, who may be a pharmacist or an end user, that the pharmaceutical product 52 has expired and may no longer be safe or effective. In other embodiments, each cavity 34, or a subset of cavities 34, contains a sensor configured to output a signal in response to detecting an expiry vapour 54 in the pharmaceutical containing cavity 34. In one illustrative embodiment pharmaceutical containing cavities 34(A), 34(C), 34(J) and 34(L) contain sensors 56 and are configured to output a signal in response to detecting an expiry vapour 54 in the pharmaceutical containing cavity 34. It will be recognised by the person skilled in the art that this choice of pharmaceutical containing cavities is purely illustrative and that any subset of pharmaceutical containing cavities could be chosen to contain the sensors 56 in addition to the pharmaceutical product. In some embodiments there is provided a single detection circuit 20 coupled to the plurality of sensors 56 disposed in the pharmaceutical containing cavities 34. In other embodiments there may be a plurality of detection circuits 20 each connected to a different sensor 56 in one of the pharmaceutical containing cavities 34. In some embodiments there is provided a single power source 50, coupled to the one or more detection circuits 20 and the plurality of sensors 56 disposed in the pharmaceutical containing cavities 34. In other embodiments there may be a plurality of power sources 24, coupled to the one or more detection circuits 20 and the plurality of sensors 56 disposed in the pharmaceutical containing cavities 34.

FIG. 6 schematically illustrates packaging which may embody various examples of the present techniques. In this embodiment the packaging comprises a bottle 60 with a lid 62. The bottle 60 contains a quantity of a pharmaceutical product 72 which may be separated from a sensor 64 by a removable layer 70, which in this case comprises a peelable paper. The pharmaceutical products 72 may release vapours 74 which may comprise expiry vapours and regular vapours from the pharmaceutical product 72. The sensor 64 is connected to the detection circuitry 66 and the indication, which in this case is a visual indication provided by OLED 68. The detection circuitry 66, sensor 64, and OLED 68 may be disposed in the lid 62 which, in some embodiments, also comprises an energy harvester 78. In some embodiments, the energy harvester 78 may be a piezo energy harvester configured to provide power to the validation circuitry when the bottle is opened or the lid is squeezed. In other embodiments, the energy harvester may be any other kind of energy harvester including, but not limited to, a photovoltaic energy harvester, a pyroelectric energy harvester, and an electrostatic energy harvester. In further embodiments the validation circuitry may be powered by a conventional or printed battery. The lid 62 may be sealed onto the bottle 60 with a factory seal. The removable layer 70 is in place separating the pre-filled marker vapour 76 from the regular vapours and expiry vapours 74 released from the pharmaceutical products 72. In response to detecting the marker vapour 76 the sensor 64 outputs a signal to the detection circuitry 66 which, if the signal indicates the presence of a predefined marker vapour, outputs an indication which in this embodiment is a visual indication provided by OLED 68. When the consumer, who may be a pharmacist, a customer, or an end user breaks the seal and opens the lid 62 the marker vapours disperse and the sensor 64 ceases to output a signal. As a result the detection circuitry 66 ceases to output the indication and a visual indication provided by the OLED 68 indicates to the consumer that the pharmaceutical product 72 is genuine. In some embodiments the bottle 60 also comprises any number of sensors 64 and detection circuits 66. Each of the sensors 64 may be adapted to output a signal to a dedicated detection circuit 66 which is adapted to indicate a specific pre-filled marker vapour 76 or regular vapour. In other embodiments the detection circuitry 66 may be shared between a plurality of sensors 64. It will be appreciated by the person skilled in the art that these are just examples and any combination of sensors 64 and detection circuits 66 could be combined to detect any number of vapours either individually or in combination.

FIG. 7 schematically illustrates packaging which may embody various examples of the present techniques. In this embodiment the bottle 60 contains pharmaceutical product 72 and has a lid 62. The lid 62 comprises a sensor 64 configured to detect an expiry vapour 74 in the cavity formed by the bottle 60. The lid further comprises detection circuitry 66, OLED 68, energy harvester 78, and a groove lock mechanism 80. The sensor 64 is configured to output a signal in response to detecting the expiry vapour 74 in the bottle 60. The detection circuitry 66 is configured to output an indication in response to identifying that the signal corresponds to a predefined vapour signature. In response to the indication, the groove lock mechanism 80 is configured to lock the lid 62 to prevent (or at least hinder) the consumer from unscrewing the lid and accessing the pharmaceutical product 72 which is producing an expiry vapour 74 indicating that the pharmaceutical product 72 may no longer be safe or effective. In addition, OLED 68 may provide a visual indication that the pharmaceutical product 72 has expired.

FIG. 8 schematically illustrates packaging which may embody various examples of the present techniques. In this embodiment the sensor 64 and the detection circuit 66 are configured to indicate the presence of a marker vapour 76 and an expiry vapour 74 released from the pharmaceutical product 72. The bottle 60 comprises a lid 62 with validation circuitry and energy harvester 78 disposed therein. The energy harvester 78 is configured to provide power to the validation circuitry which comprises at least the sensor 64, the detection circuitry 66, the OLEDs 68, and the groove lock mechanism 80. In this embodiment OLEDs 68 comprise at least a first OLED 68(A) configured to provide a visual indication that a marker vapour 76 is present and a second OLED 68(B) configured to provide a visual indication that an expiry vapour 74 is present. The bottle 60 further comprises a pinhole 82 which acts as a test spot configured to be punctured by a puncturing member 40.

The bottle 60 contains the pharmaceutical product 72 and a pre-filled marker vapour 76. The lid 62 is sealed onto the bottle 60 forming an air tight seal to prevent the marker vapour 76 and any expiry vapours 74 from being released. In response to sensing the presence of marker vapour 76 the sensor 64 outputs a marker signal. The detection circuitry is configured to output a marker indication in response to identifying that the marker signal output by the sensor 64 corresponds to a predefined marker vapour signature. In this embodiment the marker indication is a visual indication provided by OLED 68(A), which provides the consumer with verification that the pharmaceutical product 72 is likely to be genuine and has not been tampered with or replaced.

When the pharmaceutical product 72 approaches the end of its shelf life it begins to release an expiry vapour 74. The sensor 64 is configured to output an expiry signal in response to detecting the expiry vapour 74 in the bottle 60. The detection circuitry is configured to output an expiry indication when the expiry signal indicates a predefined expiry vapour signature. In this embodiment the expiry indication is a visual indication provided by OLED 68(B), which provides the consumer with a visual indication informing them that the pharmaceutical product 72 has expired and may not be safe or effective. In addition, groove lock mechanism 80 is configured to respond to the expiry indication to lock the lid 62 onto the bottle 60 making it difficult for the consumer to access the pharmaceutical product 72.

When OLED 68(B) does not indicate that the pharmaceutical product 72 has expired the groove lock mechanism 80 is configured to be in an unlocked state and the lid 62 can be removed. Removing the lid will break the factory seal and cause the marker vapour 76 to be released, resulting in the sensor 64 ceasing to output the marker signal and the detection circuitry 66 ceasing to output the indication to OLED 68(A). The change in visual indication provided by the removal of the lid 62 provides further verification to the consumer that the pharmaceutical product 72 is genuine.

In some situations it may be desirable to validate whether the pharmaceutical product 72 is genuine without opening the lid 62 and breaking the factory seal. In some embodiments there is provided a pinhole 82 which acts as a test spot configured to be pierced by piercing member 40 to release the marker vapour 76 from the bottle 60. The release of the marker vapour 76 from the bottle 60 will cause a change in the visual indication 68(A) in the same way as unscrewing the lid. In some embodiments the pin hole comprises a self-sealing valve embedded in the bottle which is breached by piercing with the piercing member 40 which comprises a hollow needle. The marker vapour 76 exits through the hollow needle to allow the validity of the pharmaceutical products to be determined. Once the hollow needle is removed the self-sealing valve would reseal resulting in a sealed container for the pharmaceutical product. In this way it is possible to test whether the pharmaceutical product 72 is genuine without opening the lid 62.

FIG. 9 schematically illustrates packaging which may embody various examples of the present techniques. In this embodiment the lid 62 of the bottle 60 comprises a test cavity 90. The lid 62 comprises a first closed position 100 as illustrated on the left hand side of FIG. 9 and a second closed position 102 as illustrated on the right hand side of FIG. 9. When the lid 62 is in the first closed position 100 the test cavity is fluidly connected to the inside of the bottle 60 through opening 94 but sealed from the outside of the bottle 60. This allows a pre-filled marker vapour 98 to flow into the test cavity 90. The validation circuitry 96 comprises a sensor and detection circuitry electrically connected to the OLED 68 and is configured to provide a visual indication when marker vapour 98 is detected in the test cavity.

As illustrated in the right hand side of FIG. 9, when the lid 62 is moved into the second closed position 102 the test cavity 90 is rotated with the lid 62 such that the test cavity 90 is fluidly connected to the outside of the bottle 60 and is sealed from the inside of the bottle 60. Moving the test cavity from the first closed position 100 to the second closed position 102 may require the user to break a factory seal that enables the testing mechanism. In the second closed position 102 the test vapour 98 that has accumulated in the test cavity 90 whilst in the first closed position 100 is able to disperse out of the bottle through the hole 92. The validation circuitry 96 responds to the absence of the marker vapour 98 and causes the indication to cease. In this embodiment this causes the visual indication provided by the OLED 68 to cease. The visual indication provided by the OLED in response to moving the lid 62 from the first closed position 100 to the second closed position 102 allows the consumer to validate that the marker volatile is present and therefore that the pharmaceutical product comes from a trusted source.

As the bottle 60 still contains a quantity of the marker volatile 98 the lid 62 can be moved from the second closed position 102 back to the first closed position 100 allowing the marker vapour 98 to move back into the test cavity 90 through the hole 94. In this way the validity of the pharmaceutical product can be tested repeatedly.

FIG. 10 schematically illustrates a system comprising validation circuitry 104 and a vapour gun 120 which may embody various examples of the present techniques. The system comprises validation circuitry 104 which comprises sensor 106, detection circuitry 108, OLED 110, and printed battery 112. The system further comprises a vapour gun 120 that is configured to output a quantity of a vapour 114 in response to a user stimulus 116. In this way the user, who in this case is typically a pharmacist, can verify that the validation circuitry 104 is genuine. Particularly sophisticated fraudsters with access to expensive equipment may be able to overcome the suggested verification steps set out with reference to FIGS. 1 to 9 by fabricating their own validation circuitry tuned to their own marker vapours. However, by providing a vapour gun comprising a quantity of one or more predefined marker vapours 118 the user can test the response of the validation circuitry. This can be achieved if, by way of example, the pharmaceutical product was a first pharmaceutical product that was known to correspond to the predefined vapour 118(1) in the vapour samples provided with the vapour gun 120. After performing the verification steps set out with reference to FIGS. 1 to 9, the user could set the vapour gun to output marker vapour 118(1) onto the sensor. If the validation circuitry was genuine then an indication would be displayed in response to the vapour gun outputting marker vapour 118(1) onto the sensor 106. In this embodiment the indication would be a visual indication provided by OLED 110 in response to the detection circuitry 108 identifying that a signal output by the sensor 106 corresponds to a predefined vapour signature identified by the detection circuitry 108. If however the vapour output by the vapour gun did not correspond to the predefined vapour signature stored in the detection circuitry then no indication would be displayed. The vapour output by the vapour gun 120 can be selected from a number of vapour samples 118. In this way the validation circuitry for a number of different pharmaceutical products could be verified. Alternatively, by selecting a vapour that does not correspond to the first pharmaceutical product it can be validated that the validation circuitry 104 does not simply provide an indication for a wide range of pharmaceutical products. In this way it is possible to verify that the validation circuitry 104 is genuine and therefore that any indication provided by the validation circuitry 104 with reference to a pharmaceutical product is accurate.

FIG. 11 shows a sequence of steps that are carried out by some embodiments of the present techniques. In S2 the validation circuitry performs the step of generating a signal in response to sensing a vapour in a cavity of packaging for a pharmaceutical product. In S4 the validation circuitry performs the step of indicating when the signal indicates a predefined vapour.

In brief overall summary packaging for a pharmaceutical product and a method of validating pharmaceuticals is disclosed. The packaging comprising a cavity; and validation circuitry comprising: a sensor adapted to output a signal in response to detecting a vapour in the cavity; and a detection circuit adapted to output an indication when the signal indicates a predefined vapour signature.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A packaging for a pharmaceutical product comprising:
a cavity;
validation circuitry comprising:
a sensor adapted to output a signal in response to detecting a vapour in the cavity; and,
a detection circuit adapted to output an indication when the signal indicates a predefined vapour signature;
a bottle that contains the pharmaceutical product and that comprises a lid, where the lid comprises the validation circuitry, wherein:
the vapour is a marker vapour contained in the cavity and the cavity is a test cavity disposed in the lid comprising an inlet and an outlet;
the lid is adapted such that when in a first closed position, the test cavity is in fluid connection with an interior of the bottle and is sealed from an exterior of the bottle;
the lid is adapted such that when in a second closed position, the test cavity is sealed from the interior of the bottle and is in fluid connection with the exterior of the bottle; and
the lid is adapted such that when the lid is moved from the first closed position to the second closed position, the vapour is released from the test cavity.

2. The packaging of claim 1, wherein the predefined vapour signature comprises at least one value stored in the validation circuitry and the detection circuitry is adapted to output the indication in dependence on a comparison based on the signal and the at least one stored value.

3. The packaging of claim 2, wherein the detection circuitry comprises machine learning circuitry and the at least one stored value is generated and stored in a training procedure carried out by the machine learning circuitry.

4. The packaging of claim 1, wherein the validation circuitry comprises flexible electronics.

5. The packaging of claim 1, wherein the indication is a visual indication.

6. The packaging of claim 1, wherein the detection circuit is adapted not to output the indication when the signal does not correspond to the predefined vapour signature.

7. The packaging of claim 1, wherein the sensor comprises at least one of:
a thin film transistor sensor; and,
a resistive sensor.

8. The packaging of claim 1, wherein the sensor comprises an array of sensors and the signal is comprised of a set of signals,
wherein each of the set of signals is output in response to the vapour; and,
the detection circuit is adapted to output the indication when the set of signals corresponds to the predefined vapour signature.

9. The packaging of claim 1, wherein the vapour is an expiry vapour released from the pharmaceutical product; and,
a release rate of the expiry vapour from the pharmaceutical product is dependent on the age of the pharmaceutical product.

10. The packaging of claim 9, wherein the predefined vapour signature comprises a minimum vapour concentration of the expiry vapour.

11. The packaging of claim 1, wherein the vapour is a marker vapour contained in the cavity.

12. The packaging of claim 1, wherein the cavity is adapted to release the vapour in response to the cavity being breached.

13. The packaging of claim 1, wherein the vapour is an expiry vapour released from the pharmaceutical product, and a release rate of the expiry vapour from the pharmaceutical product is dependent on the age of the pharmaceutical product,
wherein the lid of the bottle comprises a lock mechanism having an unlocked state and a locked state; and,
wherein the lock mechanism is adapted to enter the locked state in response to the indication.

14. The packaging of claim 1, wherein the pharmaceutical product is separated from the marker vapour by a removable layer.

15. The packaging of claim 1, wherein the bottle is adapted to release the marker vapour from the cavity in response to the lid being opened.

16. The packaging of claim 1, wherein the bottle comprises a test spot adapted to release the marker vapour from the cavity in response to the cavity being breached.

17. The packaging of claim 1, wherein the validation circuitry comprises a power source.

18. The packaging of claim 17, wherein the power source is a printed power source.

19. The packaging of claim 18, wherein the printed power source is a printed battery.

20. The packaging of claim 18, wherein the printed power source is an energy harvester.

21. A system comprising:
the packaging of claim 1; and,
a vapour gun containing a preselected test vapour, wherein the vapour gun is adapted to output a quantity of the preselected test vapour in response to a user stimulus,
wherein the detection circuitry is adapted to output the indication when the signal indicates the preselected test vapour is in the cavity.

22. The system of claim 21, wherein the vapour gun further comprises a plurality of test vapours comprising the preselected test vapour and is adapted to output one of the plurality of test vapours in response to a user selection.

23. The system of claim 22, wherein the plurality of test vapours comprises the predefined vapour signature.

24. A method of validating pharmaceuticals comprising:
generating a signal in response to sensing a vapour in a cavity of packaging for a pharmaceutical product using a sensor; and,
indicating when the signal indicates a predefined vapour signature, wherein:
the packaging comprises a bottle that contains the pharmaceutical product and the bottle comprises a lid and the lid comprises the sensor,
the vapour is a marker vapour contained in the cavity,
the cavity is a test cavity disposed in the lid comprising an inlet and an outlet,
moving the lid to a first closed position causes the test cavity to be in fluid connection with an interior of the bottle and sealed from an exterior of the bottle,
moving the lid to a second closed position causes the test cavity to be sealed from the interior of the bottle and in fluid connection with the exterior of the bottle, and
moving the lid from the first closed position to the second closed position causes the vapour to be released from the test cavity.

25. Packaging for a pharmaceutical product comprising:
means for generating a signal in response to sensing a vapour in a cavity of packaging for a pharmaceutical product using a means for sensing; and means for indicating when the signal indicates a predefined vapour signature, wherein:

the packaging comprises a bottle that contains the pharmaceutical product, the bottle comprises a lid and the lid comprises the means for sensing, the vapour is a marker vapour contained in the cavity, and the cavity is a test cavity disposed in the lid comprising an inlet and an outlet, the lid is adapted such that when in a first closed position, the test cavity is in fluid connection with an interior of the bottle and is sealed from an exterior of the bottle, the lid is adapted such that when in a second closed position, the test cavity is sealed from the interior of the bottle and is in fluid connection with the exterior of the bottle, and the lid is adapted such that when the lid is moved from the first closed position to the second closed position, the vapour is released from the test cavity.

\* \* \* \* \*